United States Patent [19]
Kartchner et al.

[11] Patent Number: 6,101,057
[45] Date of Patent: Aug. 8, 2000

[54] METHOD AND SYSTEM FOR PROVIDING A HARD STOP FOR A ROBOT IN AN AUTOMATED TAPE CARTRIDGE LOADING/UNLOADING SYSTEM

[75] Inventors: Kevin Keith Kartchner; Colleen Renee Stouffer, both of Tucson, Ariz.

[73] Assignee: International Business Machines Corporation, Armonk, N.Y.

[21] Appl. No.: 08/982,488

[22] Filed: Dec. 2, 1997

[51] Int. Cl.[7] .................................................. G11B 15/18
[52] U.S. Cl. ............................................................ 360/69
[58] Field of Search .............................. 360/92, 69, 96.5, 360/71

[56] References Cited

U.S. PATENT DOCUMENTS

| | | | |
|---|---|---|---|
| 4,933,790 | 6/1990 | Mitumaru | 360/96.5 |
| 5,220,260 | 6/1993 | Schuler | 318/561 |
| 5,498,116 | 3/1996 | Woodruff et al. | 414/331 |
| 5,559,412 | 9/1996 | Schuler | 318/561 |

*Primary Examiner*—Andrew L. Sniezek
*Attorney, Agent, or Firm*—Robert M. Sullivan; Felsman, Bradley, Vaden, Gunter & Dillon, LLP

[57] ABSTRACT

A method and system are disclosed for providing a hard stop for a robot included within an automated tape cartridge loading/unloading system. The system includes a tape drive having a loader which includes a movable loader tray. The loader tray is moved by a loader motor included within the loader. A determination is made of an insertion of a tape cartridge by the robot into a front of the tape drive. This determination is made utilizing a sensor included within the tape drive. In response to the determination, the tray is continuously held against the front of the tape drive while the tape cartridge is being inserted into the drive by the robot, thus providing a hard stop for the robot once the tape cartridge is completely inserted into the tray.

4 Claims, 4 Drawing Sheets

METHOD AND SYSTEM FOR PROVIDING A HARD STOP FOR A ROBOT IN AN AUTOMATED TAPE CARTRIDGE LOADING/UNLOADING SYSTEM

BACKGROUND OF THE INVENTION

1. Technical Field

The present invention relates to data processing systems and, in particular, to automated tape cartridge loading/unloading systems. Still more particularly, the present invention relates to an automated tape cartridge loading/unloading system which includes a method and system for providing a hard stop in a loader having a movable loader tray for a robot in the system.

2. Description of the Related Art:

There is a need in data processing systems to provide for permanent storage of large quantities of data utilized by the systems. Typically, tape drives included within these systems are utilized to store this data on magnetic tapes. In order for a computer within the system to access data stored on a tape, the magnetic tape must first be loaded into the tape drive. Very often, multiple tapes may need to be accessed by a data processing system in order to utilize the data stored on these tapes. Therefore, multiple tapes may need to be loaded into and unloaded from the tape drive during a relatively short period of time.

In some data processing systems, many tape drives may be concurrently coupled to the system. In these systems, it can be very time consuming for a user to repeatedly load and unload cartridges from the various tape drives. Therefore, often a robot will be utilized to perform the loading and unloading operations. The robot will typically include a gripper which is attached to an arm of the robot to grip, or hold, a tape cartridge. The robot will pick a cartridge from a storage rack which stores the multiple cartridges which are not currently in use. The robot will then insert the cartridge into a loader of the selected tape drive. When the system no longer needs to access the tape cartridge, the robot will grip the cartridge when the loader has unloaded the cartridge and return it to the storage rack.

During a load operation, one type of robot will push forward until a hard stop is reached. A hard stop is indicated to the robot by the amount of current drawn on the motor of the robot which turns a lead screw which advances the cartridge gripper. Until a hard stop is reached by the robot, the robot will continue to push the tape cartridge forward.

For other types of robots, the robot will push forward until it has reached a particular predetermined location.

Some tape drive systems include a movable tray within the loader of the drive. The tray moves freely when a loader motor is not operating. When a tape cartridge is inserted into this type of tape drive, the tray begins to receive the cartridge. At a predetermined point, a forward insertion movement should be stopped. At this point, the tray is then moved by the loader motor in order to complete the loading process. This type of tape drive does not provide a hard stop.

Providing a hard stop in a tape drive system is beneficial when the drive is configured to be utilized with a robot. Robots expect to repeatedly place and pick tape cartridges from the same physical location. Providing a hard stop simplifies the pick and place operation and improves the reliability if the tape cartridge is always located in the same place. The hard stop thus lets the robot place the cartridge into a non-moving location and pick it up from the exact same non-moving location. This location is the tape drive's loader tray. Any motion of the loader tray during the pick and place operation contributes to failure of that operation.

Therefore a need exists for a method and system to provide a hard stop within a loader in a tape cartridge loading/unloading system having a moveable loader tray, where the tray moves freely when the loader motor is not operating.

SUMMARY OF THE INVENTION

It is therefore one object of the present invention to provide an improved data processing system.

It is another object of the present invention to provide an improved automated tape cartridge loading/unloading system.

It is yet another object of the present invention to provide an automated tape cartridge loading/unloading system which includes a method and system for providing a hard stop in a loader having a movable loader tray for a robot in the system.

The foregoing objects are achieved as is now described. A method and system are disclosed for providing a hard stop for a robot included within an automated tape cartridge loading/unloading system. The system includes a tape drive having a loader which includes a movable loader tray. The loader tray is moved by a loader motor included within the loader. A determination is made of an insertion of a tape cartridge by the robot into a front of the tape drive. This determination is made utilizing a sensor included within the tape drive. In response to the determination, the tray is continuously held against the front of the tape drive while the tape cartridge is being inserted into the drive by the robot, thus providing a hard stop for the robot once the tape cartridge is completely inserted into the tray. The tray is held against the front of the drive by a force which is greater than the force used by the robot to push the tape cartridge forward, but less than the full motor power.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
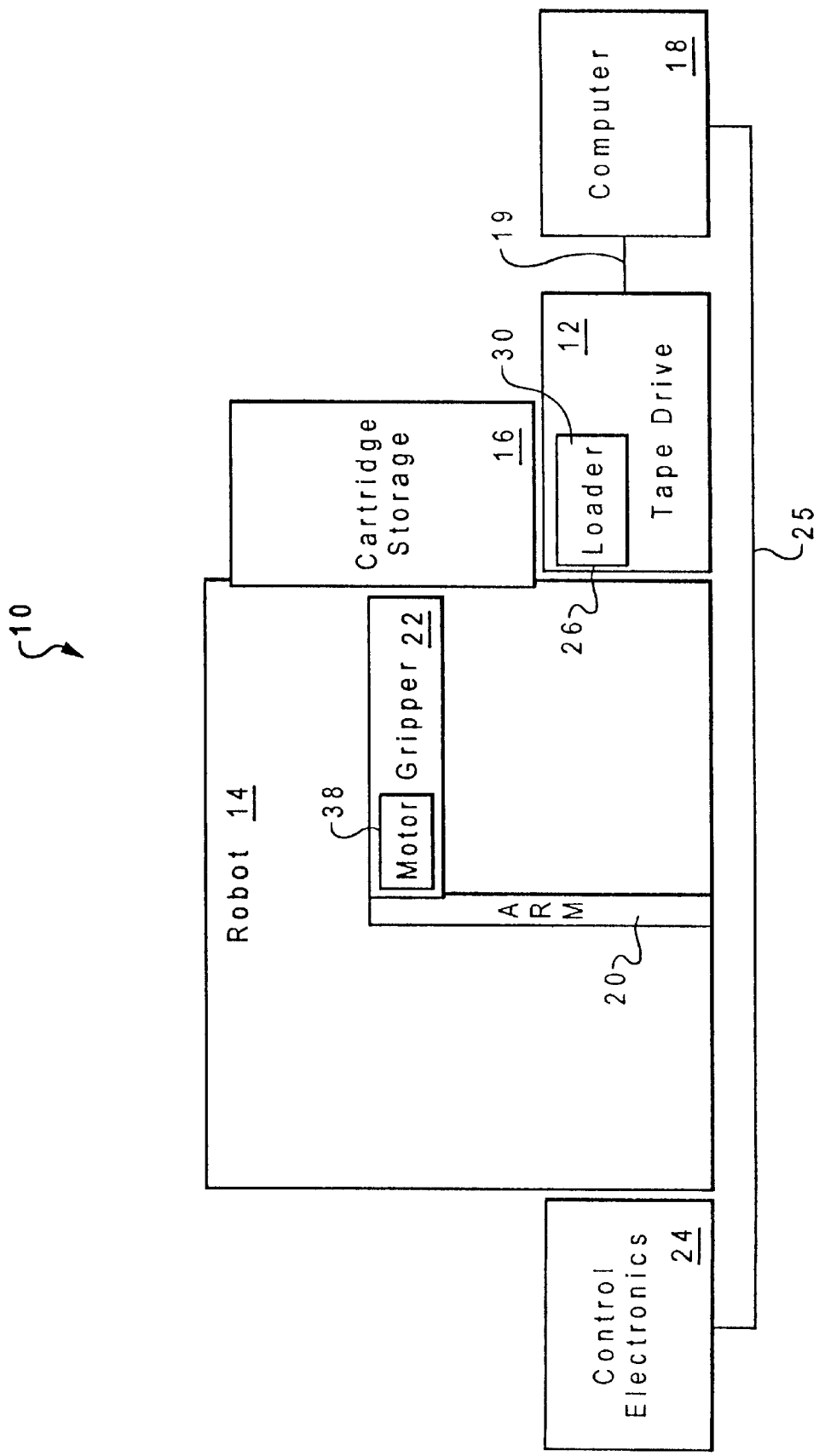
FIG. 1 depicts a block diagram of an automated tape cartridge loading/unloading system in accordance with the method and system of the present invention.
Figure 2:
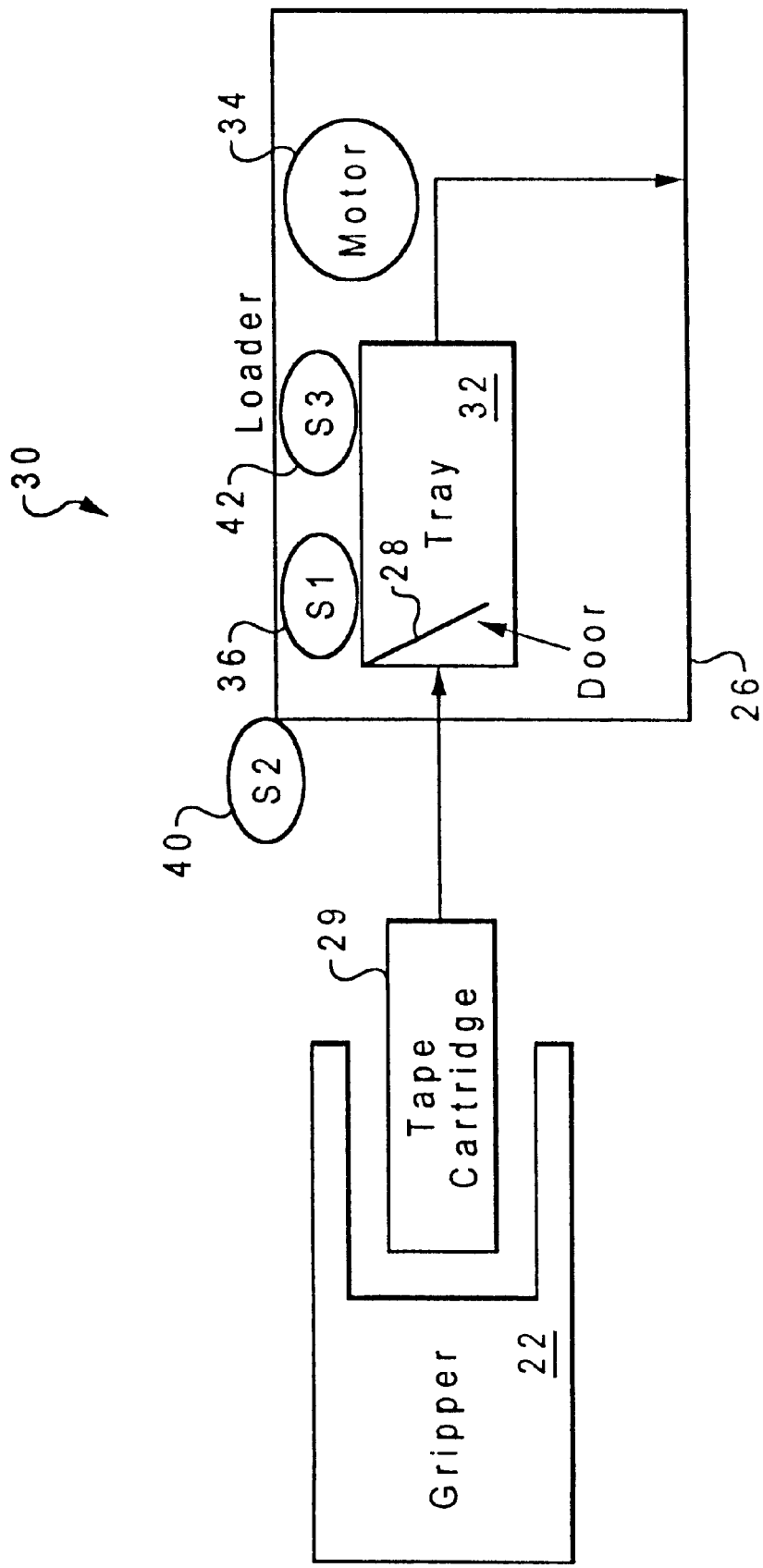
FIG. 2 illustrates a block diagram of a loader included within a tape drive of FIG. 1 in accordance with the method and system of the present invention.
Figure 3:
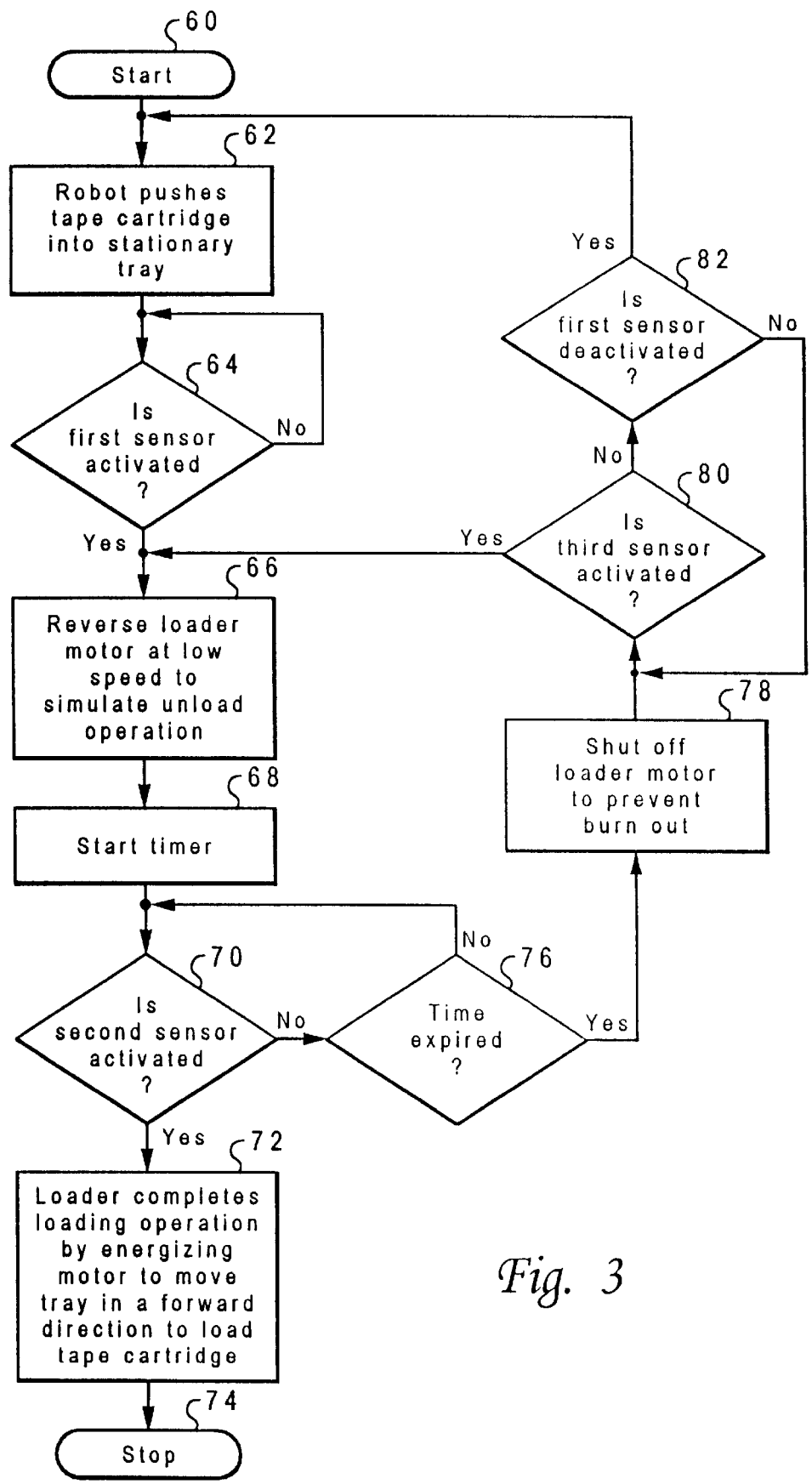
FIG. 3 depicts a high-level flow chart illustrating the providing of a hard stop in a loader in a tape drive having a movable loader tray for a robot during a load operation in accordance with the method and system of the present invention.

A preferred embodiment of the present invention and its advantages are better understood by referring to FIGS. 1–3 of the drawings, like numerals being used for like and corresponding parts of the accompanying drawings.

FIG. 1 depicts a block diagram of an automated tape cartridge loading/unloading system 10 in accordance with the method and system of the present invention. The system includes a tape drive 12, a robot 14, a cartridge storage device 16, and a data processing system including a computer 18. When a data processing system 18 needs to access data stored on one of the tape cartridges, computer 18 utilizes communications link 19. The tape cartridge is then selected from cartridge storage device 16 by robot 14.

Robot 14 includes an arm 20 having a gripper 22 for gripping tape cartridges, and control electronics 24 for controlling robot 14. Computer 18 communicates with robot 14 via control electronics 24 utilizing a communications link 25 in order to instruct robot 14 to select a particular tape cartridge and insert the cartridge into tape drive 12. Robot 14 utilizes gripper 22 to select the desired tape cartridge from cartridge storage device 16. Robot 14 then inserts the desired tape cartridge into a front 26 of tape drive 12 through a loader door 28.

FIG. 2 illustrates a block diagram of a loader 30 included within tape drive 12 of FIG. 1 in accordance with the method and system of the present invention. Tape drive 12 includes loader 30 for loading and unloading a tape cartridge 29 into tape drive 12. Loader 30 includes a tray 32 and a loader motor 34. Tray 32 is movable and can move freely within loader 30 when loader motor 34 is not energized. In an idle state, tray 32 is located in the unloaded position, ready to receive a tape cartridge.

When tape cartridge 29 is inserted into tape drive 12, it is received within tray 30 which causes door 28 to be opened. Gripper 22 then retracts from tape drive 12. Loader motor 34 is energized and moves tray 32 in a forward direction away from front 26 of tape drive 12 in order to complete the loading process. Tape cartridge 29 may then be accessed by data processing system 18 utilizing tape drive 12.

When tape cartridge 29 is no longer needed, an unload operation is performed. During an unload operation, tray 32 is moved in a reverse direction toward front 26 of tape drive 12. Tape cartridge 29 may then be removed from tape drive 12 by robot 14 utilizing gripper 22.

A tape drive may be configured to be operated in a system including a robot, or in a system whereby a human inserts and removes tape cartridges from the drive. Tape drive 12 is initially configured to provide no hard stop when tape cartridge 29 is inserted into tray 32. When tape cartridge 29 is inserted, at a predetermined point, a forward pushing motion is no longer required by a user or robot in order to completely insert tape cartridge 29 into tray 32. At this point, tray 32 takes tape cartridge 29 and completes the insertion process automatically. This point is determined when third sensor 42 is activated. Thereafter, tape drive 12 completes the loading process.

Some robots, however, require a hard stop in order to determine when to stop the forward pushing motion. Those skilled in the art will recognize that the method and system described may be implemented in a system including a robot requiring a hard stop, or a robot which does not require a hard stop but merely pushes the tape cartridge forward to a predetermined location.

If a robot requiring a hard stop is utilized with a tape drive which provides no hard stop, the robot will continue pushing the tape cartridge forward after the predetermined point where a forward pushing motion is no longer required. If the robot continues to push past this point, the tape drive, tape cartridge, and/or robot may be damaged. In many cases, even where damage does not occur, the loader will fail to correctly load the tape cartridge because of mechanical misalignments.

Robot 14 requires a hard stop in order to determine when to stop a forward pushing motion to insert tape cartridge 29. Tape drive 12 typically does not provide a hard stop. By implementing the method and system of the present invention in this type of tape drive, a hard stop is also provided so that robot 14 may be utilized with tape drive 12. For robots that do not require a hard stop, the reliability of the pick/place operation is improved utilizing the described method and system.

A first sensor 36 included within tape drive 12 indicates when tape cartridge 29 is being inserted into tape drive 12. Sensor 36 is located above the loader door 28 and indicates when loader door 28 is moved by the insertion or removal of tape cartridge 29 from loader 30. In response to sensor 36 indicating loader door 28 is moved, loader motor 34 is energized and moves tray 32 in a reverse direction. The reverse direction is the direction tray 32 is normally moved to unload a tape cartridge. Sensor 36 is deactivated when tape cartridge 29 is removed from loader 30.

Those skilled in the art will recognize that instead of utilizing sensors to indicate when a tape cartridge is to be loaded, robot 14 may communicate with drive 12 utilizing control electronics 24. In such a system, control electronics notifies drive 12 when either a load or unload operation is to be performed.

Motor 34 is continuously energized to hold tray 32 pushed against front 26 of tape drive 12 while robot 14 is inserting tape cartridge 29 into tape drive 12. In this manner, while tape cartridge 29 is being inserted into tape drive 12, tape drive 12 simulates an unload operation by attempting to continuously move tray 32 in an unload, or reverse, direction. Tray 32 is held against front 26 of tape drive 12 utilizing a force which is greater than the force utilized by robot 14 to push tape cartridge 29 forward, but less than the full power of motor 34. Utilizing the full power of motor 34 would cause motor 34 or the electronics of the motor driver for motor 34 to burn out.

When tape cartridge 29 is completely inserted into tray 32, robot 14 detects a hard stop because robot 14 will no longer be able to easily push tape cartridge 29 further into tape drive 12. The hard stop is detected by robot 14 when the amount of current drawn by a motor 38 of the robot 14 increases to a predetermined level. When the hard stop is detected, robot 14 will release tape cartridge 29 and will withdraw gripper 22 from tape drive 12. A second sensor 40 is included. It detects the withdrawal of gripper 22 from loader 30 following gripper's 22 insertion of tape cartridge 29. Sensor 40 is located on front 26 of loader 30 and detects when gripper 22 is withdrawn from tape drive 12.

Alternatively, gripper 22 may extend to a predetermined physical location when placing tape cartridge 29 into drive 12. If tray 32 is moved during this placement with no feedback to gripper 22, the placement could fail.

When second sensor 40 indicates gripper 22 is withdrawn from tape drive 12, tape drive 12 initiates a normal load operation. At this time, loader motor 34 is energized to move tray 32 in a forward direction within tape drive 12 in order to complete the loading operation.

In order to unload the tape cartridge from tape drive 12, loader motor 34 is energized in a reverse direction to move tray 32 toward front 26 of tape drive 12. Robot 14 then removes tape cartridge 29 and replaces it in cartridge storage device 16. Third sensor 42 is included above tray 32 and is activated when tray 32 travels into tape drive 12. Sensor 42 is utilized during an unload operation to restart the algorithm described in FIG. 3 if robot 14 pushes tape cartridge 29 back into tape drive 12.

FIG. 3 depicts a high-level flow chart illustrating providing a hard stop in a loader in a tape drive having a movable loader tray in accordance with the method and system of the present invention.

The process starts as depicted at block 60 and thereafter passes to block 62. Block 62 illustrates the robot pushing the tape cartridge into the stationary tray. Next, block 64 depicts a determination of whether or not a first sensor has been activated. A first sensor is activated upon the insertion of a tape cartridge into a tape drive which causes the loader door to be moved. Therefore, a first sensor is activated upon an attempt to load a tape cartridge into the drive. If a determination is made that the first sensor has not been activated, the process passes back to block 64.

Referring again to block 64, if a determination is made that the first sensor has been activated, the process passes to block 66 which depicts reversing a loader motor at low speed in order to simulate an unload operation. By reversing the loader motor, a tray within the tape drive which receives the tape cartridge is moved to the front of the tape drive and is continuously held there until a second sensor is activated. Block 68 illustrates a starting of a timer within computer 18. Preferably, the timer will be set for ten seconds. Next, block 70 depicts a determination of whether or not the second sensor has been activated. If a determination is made that the second sensor has been activated, the process passes to block 72. Block 72 depicts the loader of the tape drive completing the loading operation by energizing the motor to move the tray in a forward direction away from the front of the tape drive in order to load the cartridge. The process then terminates as depicted at block 74.

Referring again to block 70, if a determination is made that the second sensor has not been activated, the process passes to block 76 which illustrates a determination of whether or not time being counted by the timer has expired. If a determination is made that the time has not expired, the process passes back to block 70. Referring again to block 76, if a determination is made that the time has expired, the process passes to block 78 which depicts the shutting off of the loader motor in order to prevent burn out of the motor or the motor driver electronics. Next, block 80 illustrates a determination of whether or not a third sensor has been activated. If a determination is made that the third sensor has been activated, the process passes to block 66. Referring again to block 80, if a determination is made that the third sensor has not been activated, the process passes to block 82 which illustrates a determination of whether or not the first sensor has been deactivated. If a determination is made that the first sensor is not deactivated, the process passes back to block 80. If a determination is made that the first sensor has been deactivated, the process passes back to block 62.

Figure 4:
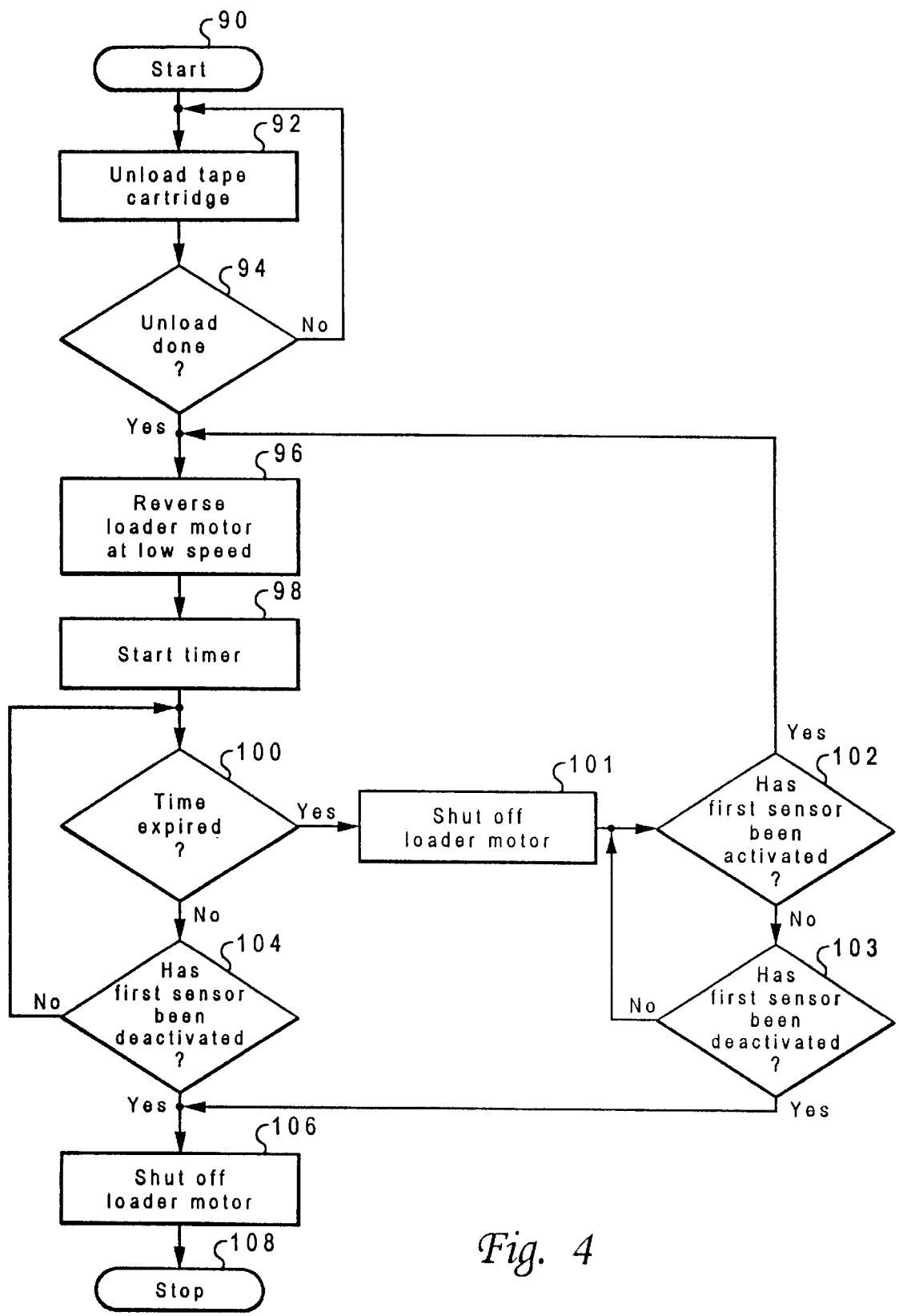
FIG. 4 illustrates a high-level flow chart depicting the providing of a hard stop in a loader in a tape drive having a movable loader tray for a robot during an unload operation in accordance with the method and system of the present invention.

FIG. 4 illustrates a high-level flow chart depicting the providing of a hard stop in a loader in a tape drive having a movable loader tray for a robot during an unload operation in accordance with the method and system of the present invention. The process starts as depicted at block 90 and thereafter passes to block 92 which depicts the unloading of a tape cartridge. Next, block 94 illustrates a determination of whether or not the unloading process has been completed. If a determination is made that the unloading process has not been completed, the process passes back to block 92.

Referring again to block 94, if a determination is made that the unloading process has been completed, the process passes to block 96 which depicts the reversing of the loader motor at low speed. Next, block 98 illustrates the starting of a timer. Preferably, the timer is set for ten seconds. Thereafter, block 100 depicts a determination of whether or not the time being counted by the timer has expired. If a determination is made that the time has expired, the process passes to block 101 which illustrates the shutting off of the loader motor. Thereafter, the process passes to block 102 which depicts a determination of whether or not a first sensor has been activated. If a determination is made that the third sensor has not been activated, the process passes to block 103 which depicts a determination of whether or not the first sensor has been deactivated. If a determination is made that the first sensor has not been deactivated, the process passes back to block 102.

Referring again to block 103, if a determination is made that the first sensor has been deactivated, the process passes to block 106. Referring again to block 102, if a determination is made that the first sensor has been activated, the process passes back to block 96.

Referring back to block 100, if a determination is made that the time has not expired, the process passes to block 104 which illustrates a determination of whether or not the first sensor has been deactivated. If a determination is made that the first sensor has not been deactivated, the process passes back to block 100.

Referring again to block 104, if a determination is made that the first sensor has been deactivated, the process to block 106 which depicts the shutting off of the loader motor. Thereafter, the process terminates as illustrated at block 108.

Those skilled in the art will recognize that the method and system described above for providing a hard stop in an automated tape cartridge loading and unloading system may be implemented in systems including either a robot requiring a hard stop or a robot which does not require a hard stop but merely pushes the tape cartridge to a predetermined location.

While a preferred embodiment has been particularly shown and described, it will be understood by those skilled in the art that various changes in form and detail may be made therein without departing from the spirit and scope of the present invention.

What is claimed is:

1. A method in an automated tape cartridge loading and unloading system for providing a hard stop for a robot included within said system, said robot capable of inserting and removing a tape cartridge from a tape drive included within said system, said tape drive having a loader motor and a moveable loader tray, said loader motor capable of moving said loader tray, said loader tray being capable of moving freely within said tape drive when said loader motor is not energized, said method comprising the steps of:

determining an insertion of a tape cartridge by said robot into a front of said tape drive utilizing a sensor included within said tape drive;

permitting an insertion of said tape cartridge into said tape drive utilizing a gripper of a robot;

detecting an opening of said door included within said front of said tape drive utilizing said sensor included within said tape drive in response to an insertion of a tape cartridge into said tape drive;

starting said loader motor in response to said sensor detecting an opening of said door;

moving said tray in a reverse direction to move said tray toward said front of said tape drive;

continuing to energize said motor to move said tray in said reverse direction to continuously hold said try against said front of said tape drive until said tape cartridge is completely inserted into said tray to provide a hard stop for said robot when said tape cartridge is completely inserted into said tray;

detecting a removal of said gripper utilizing a second sensor; and energizing said motor to move said tray in a forward direction away from said front of said tape drive to load said tape cartridge into said tape drive in response to said detection of a removal of said gripper.

2. An automated tape cartridge loading and unloading system for providing a hard stop for a robot included within said system, said robot capable of inserting and removing a tape cartridge from a tape drive included within said system, said tape drive having a loader motor and a moveable loader tray, said loader motor capable of moving said loader tray, said loader tray being capable of moving freely within said tape drive when said loader motor is not energized, comprising:

means for determining an insertion of a tape cartridge by said robot into a front of said tape drive utilizing a sensor included within said tape drive further including;

means for permitting an insertion of said tape cartridge into said tape drive utilizing a gripper of said robot;

means for detecting an opening of said door included within said front of said tape drive utilizing said sensor included within said tape drive in response to an insertion of a tape cartridge into said tape drive;

means for starting said loader motor in response to said sensor detecting an opening of said door;

means for moving said tray in a reverse direction to move said tray toward said front of said tape drive;

means for continuing to energize said motor to move said tray in said reverse direction to continuously hold said tray against said front of said tape drive until said tape cartridge is completely inserted into said tray to provide a hard stop for said robot when said tape cartridge is completely inserted into said tray;

means for detecting a removal of said gripper utilizing a second sensor; and means for energizing said motor to move said tray in a forward direction away from said front of said tape drive to load said tape cartridge into said tape drive in response to said detection of a removal of said gripper.

3. A method in an automated tape cartridge loading and unloading system for providing a hard stop for a robot included within said system, said robot capable of inserting and removing a tape cartridge from a tape drive included within said system, said tape drive having a loader motor and a moveable loader tray, said loader motor capable of moving said loader tray, said loader tray being capable of moving freely within a loader included within said tape drive when said loader motor is not energized, said method comprising the steps of:

permitting an insertion of said tape cartridge into said tape drive utilizing a gripper of said robot;

detecting an opening of a door included within a front of said tape drive utilizing a first sensor included within said tape drive in response to an insertion of a tape cartridge into said tape drive;

starting said loader motor in response to said first sensor detecting an opening of said door;

moving said tray in a reverse direction to move said tray toward said front of said tape drive;

continuing to energize said motor to move said tray in said reverse direction to continuously hold said tray against said front of said tape drive until said tape cartridge is completely inserted into said tray to provide a hard stop for said robot when said tape cartridge is completely inserted into said tray;

detecting a removal of said gripper utilizing a second sensor; and energizing said motor to move said tray in a forward direction away from said front of said tape drive to load said tape cartridge into said tape drive in response to said detection of a removal of said gripper.

4. An automated tape cartridge loading and unloading system for providing a hard stop for a robot included within said system, said robot capable of inserting and removing a tape cartridge from a tape drive included within said system, said tape drive having a loader motor and a moveable loader tray, said loader motor capable of moving said loader tray, said loader tray being capable of moving freely within a loader included within said tape drive when said loader motor is not energized, comprising:

a gripper of said robot for inserting said tape cartridge into said tape drive;

means for detecting an opening of a door included within a front of said tape drive utilizing a first sensor included within said tape drive in response to an insertion of a tape cartridge into said tape drive;

means for starting said loader motor in response to said first sensor detecting an opening of said door;

means for moving said tray in a reverse direction to move said tray toward said front of said tape drive;

means for continuing to energize said motor to move said tray in said reverse direction to continuously hold said tray against said front of said tape drive until said tape cartridge is completely inserted into said tray to provide a hard stop for said robot when said tape cartridge is completely inserted into said tray;

means for detecting a removal of said gripper utilizing a second sensor; and means for energizing said motor to move said tray in a forward direction away from said front of said tape drive to load said tape cartridge into said tape drive in response to said detection of a removal of said gripper.

\* \* \* \* \*